(12) United States Patent
Ekselius et al.

(10) Patent No.: US 10,250,929 B2
(45) Date of Patent: Apr. 2, 2019

(54) SYSTEM AND METHOD FOR DISSEMINATING DIGITAL WALLET FUNCTIONALITY TO A TARGET DEVICE

(71) Applicant: MasterCard International Incorporated, Purchase, NY (US)

(72) Inventors: Lukas Ekselius, Overijse (BE); Fikret Ates, Namur (BE); Sebastien Pochic, Brussels (BE)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 14/522,367

(22) Filed: Oct. 23, 2014

(65) Prior Publication Data
US 2015/0121405 A1 Apr. 30, 2015

(30) Foreign Application Priority Data
Oct. 29, 2013 (GB) .................................. 1319088.9

(51) Int. Cl.
| | |
|---|---|
| *H04N 21/2543* | (2011.01) |
| *G06Q 20/32* | (2012.01) |
| *G06Q 20/36* | (2012.01) |
| *H04N 21/41* | (2011.01) |
| *H04N 21/258* | (2011.01) |
| *H04N 21/478* | (2011.01) |
| *H04N 21/4367* | (2011.01) |
| *H04N 21/4788* | (2011.01) |

(52) U.S. Cl.
CPC ......... *H04N 21/2543* (2013.01); *G06Q 20/32* (2013.01); *G06Q 20/36* (2013.01); *G06Q 20/3672* (2013.01); *H04N 21/25816* (2013.01); *H04N 21/4126* (2013.01); *H04N 21/4367* (2013.01); *H04N 21/4781* (2013.01); *H04N 21/4788* (2013.01)

(58) Field of Classification Search
None
See application file for complete search history.

(56) References Cited

U.S. PATENT DOCUMENTS

2004/0210824 A1* 10/2004 Shoff ................. H04N 5/44543
715/201
2007/0095892 A1* 5/2007 Lyons .................... G06Q 20/16
235/379

(Continued)

FOREIGN PATENT DOCUMENTS

| WO | 2013/095486 A1 | 6/2013 | |
|---|---|---|---|
| WO | WO-2013-095486 A1 * | 6/2013 | ............. G06Q 20/36 |
| WO | 2014/022383 A1 | 2/2014 | |

OTHER PUBLICATIONS

Ilium Software, eWallet: User Guide and Reference for Windows PCs, Windows Mobile, iPhone, and BlackBerry, Jan. 10, 2011, Ilium Software, Version 7.2.*

(Continued)

*Primary Examiner* — Hoang Vu A Nguyen Ba
(74) *Attorney, Agent, or Firm* — Buckley, Maschoff & Talwalkar LLC

(57) ABSTRACT

A method of disseminating a digital wallet to a target device is described. The method comprises searching, with a searching device, on a local network for the target device, and pushing the digital wallet to the target device.

9 Claims, 16 Drawing Sheets

(56) References Cited

U.S. PATENT DOCUMENTS

| | | | |
|---|---|---|---|
| 2011/0191237 A1* | 8/2011 | Faith | G06F 1/1694 705/39 |
| 2011/0231872 A1* | 9/2011 | Gharachorloo | H04N 21/4126 725/28 |
| 2012/0240150 A1* | 9/2012 | Low | G06Q 20/02 725/32 |
| 2013/0304620 A1* | 11/2013 | Bhattacharya | G06Q 40/04 705/37 |
| 2013/0340044 A1* | 12/2013 | Litvin | G06F 21/41 726/4 |
| 2014/0058897 A1* | 2/2014 | Yang | G06Q 30/0623 705/26.61 |
| 2014/0108241 A1* | 4/2014 | Tunnell | G06Q 20/363 705/41 |
| 2014/0109118 A1* | 4/2014 | Kokenos | G06Q 30/02 725/5 |
| 2014/0129275 A1* | 5/2014 | Jones | G06Q 30/0207 705/7.15 |
| 2014/0130103 A1* | 5/2014 | Singh | H04N 21/234318 725/60 |
| 2015/0113563 A1* | 4/2015 | Woods | H04N 5/765 725/34 |

OTHER PUBLICATIONS

Patents Act 1977: Search Report under Section 17(5), Intellectual Property Office, dated Apr. 22, 2014, for GB Patent Application No. 1319088.9, 3pgs.

* cited by examiner

SYSTEM AND METHOD FOR DISSEMINATING DIGITAL WALLET FUNCTIONALITY TO A TARGET DEVICE

CROSS-REFERENCE TO RELATED APPLICATION

This application is a U.S. National Stage filing under 35 U.S.C. § 119, based on and claiming benefit of and priority to GB Patent Application No. 1319088.9 filed Oct. 29, 2013.

FIELD

The present disclosure relates to a system and method for disseminating functionality to a target device. In particular but not exclusively, the disclosure relates to an interaction between user devices over a network and to disseminating functionality from one of the user devices to another of the user devices.

BACKGROUND

Broadcast media incorporating an element of user-participation has expanded greatly in recent years with the explosion of reality television (TV) and both in-screen and online user voting. Traditionally, the broadcast of live events such as sporting events has been linked with "offline" audience activities that occur after the user has finished watching the broadcast. More recently with simultaneous on-line commentary through Twitter® and other social media networks users have interacted with each other and with broadcasters/programme makers in the context of both live and pre-recorded broadcasts. With the prevalence of personal computing devices such as laptops, tablets, smartphones, and smart TVs, users can launch a browser on a choice of devices to go shopping online for a product featured in a broadcast advert that they have just seen on TV.

With so many options for interacting online in response to broadcast media, audiences already have access to a wide range of ways of participating in and reacting to broadcast programmes and other broadcast content.

However, in many cases the onus for such an interaction is still on the user to launch a browser, search for the relevant online retailer or other third party website and initiate an interaction from start to finish. This is time-consuming and therefore acts as a barrier leading to non-participation or abandonment of an interaction.

Furthermore, in the case of purchasing a product online, the user may have to enter card details in a browser session or use a particular device that has already been provisioned with an electronic wallet. If a wallet has not previously been set up, the user may have to perform a set-up process from scratch on additional devices, for example by pulling a wallet from the cloud to a tablet device. This will cause inconvenience and may take a considerable amount of time. Even if a wallet has previously been established on a device such as a smartphone, a tablet with a larger screen size may be more convenient, so the user may choose to repeat the set-up process on the tablet before proceeding.

Some user-interaction with a broadcast receiving device has been possible for many years, and typically comprises an in-screen voting scenario in which users respond to a broadcast call-to-action (CTA) such as "press red to vote" and use their remotes to interact with the live show. However, this type of interaction is limited because it is typically managed either by the broadcaster or the specific channel owner and there are usually only a limited range of inter-action activities available such as voting for your favourite contestant in a so-called talent competition.

SUMMARY

According to an aspect of the present disclosure there is provided a method of disseminating a digital wallet to a target device. The method comprises searching, with a searching device, on a local network for the target device, and pushing the digital wallet to the target device. A benefit of this arrangement is that a digital wallet may be established at a target device without the need to set it up from scratch at the target device.

Pushing the digital wallet may comprise pushing the digital wallet from the searching device over the local network, or alternatively pushing the digital wallet from the cloud over the Internet in response to an instruction from the searching device.

Various user authorisation steps may apply. For example, the digital wallet may be pushed to the target device only if user authorisation has been received by the searching device. It would also be suitable for the target device to accept the pushed digital wallet only if user authorisation has been received by the target device.

The searching step may comprise searching for a plurality of target devices, selecting, at the searching device one or more target devices (discovered in the searching step) and the digital wallet may be pushed only to the or each target device selected at the searching device by the user.

A further aspect of the disclosure provides a method of disseminating a digital wallet to a target device, comprising: searching for a plurality of target devices, with a searching device, on a local network for the target device; selecting at the searching device one or more target devices; pushing the digital wallet only to the or each target device selected at the searching device by the user, and only if user authorisation has been received by the searching device; and accepting the pushed digital wallet only if user authorisation has been received by the target device; wherein pushing the digital wallet to the target device comprises pushing the digital wallet from: the searching device over the local network; or the cloud over the Internet in response to an instruction from the searching device.

A still further aspect of the disclosure provides a system for disseminating a digital wallet to a target device. The system comprises a searching device for searching on a local network for a target device, and a wallet-providing module for pushing the digital wallet to the target device.

An example useful for understanding the disclosure may be expressed as a method of providing interaction options to a user of a device. The device may be capable of receiving broadcast content from a broadcaster and content via a network. The example method may comprise receiving, at the device, both broadcast content and a call-to-action related to the broadcast content. The call-to-action is received via a network. The example method may include presenting the broadcast content and the call-to-action to the user, receiving a trigger signal from the user in response to the call-to-action, and initiating, in response to the trigger signal, an interaction over the network between the user and a call-to-action party associated with the call-to-action. The example method may enable an interaction to be established between the user and the call-to-action party regardless of whether the call-to-action party is the same entity as or a different entity to the broadcaster.

The interaction may comprise receiving, via the network, content which is related to the call-to-action.

Additionally or alternatively, the interaction may comprise the call-to-action party presenting interaction options to the user, each interaction option triggering a further action if selected.

The network may be the Internet.

Receiving a call-to-action may comprise pulling a relevant call-to-action or filtering pushed calls-to-action.

Presenting the broadcast and the call-to-action may comprise presenting the broadcast content and the call-to-action simultaneously or substantially simultaneously on a screen of the device, and/or may comprise displaying an icon indicating that call-to-action options are available.

The trigger signal may be received from a remote control.

The user may be offered an option to initiate or continue the interaction on a screen of another device. In that case, the interaction may be transferred to the screen of the other device.

The interaction may comprise creating at the device a digital wallet associated with a wallet entity or may comprise associating the device with a pre-existing digital wallet associated with a wallet entity.

The broadcaster and the call-to-action party may suitably be different entities.

The example useful for understanding embodiments of the disclosure may also be expressed as a device for providing interaction options to a user. The device comprises a broadcast communications module for receiving broadcast content, and a network-connected module for receiving content via a network. The network-connected communications module is arranged for receiving a call-to-action via the network. The device is arranged to display the broadcast content and the call-to-action to the user; receive a trigger signal from the user in response to the call-to-action; and initiate, in response to the trigger signal, an interaction over the network between the user and a call-to-action party associated with the call-to-action.

It will be appreciated that optional features of the method give rise to corresponding optional features of the device. The disclosure also extends to a non-transitory computer readable storage medium storing instructions thereon, the instructions executable by a processor and arranged to carry out the method.

BRIEF DESCRIPTION OF THE DRAWINGS

Embodiments of the disclosure will now be described, by way of example, with reference to the accompanying drawings, in which.

Throughout the drawings, like reference numerals are used to denote like features.

DETAILED DESCRIPTION OF PREFERRED EMBODIMENTS

Figure 1:
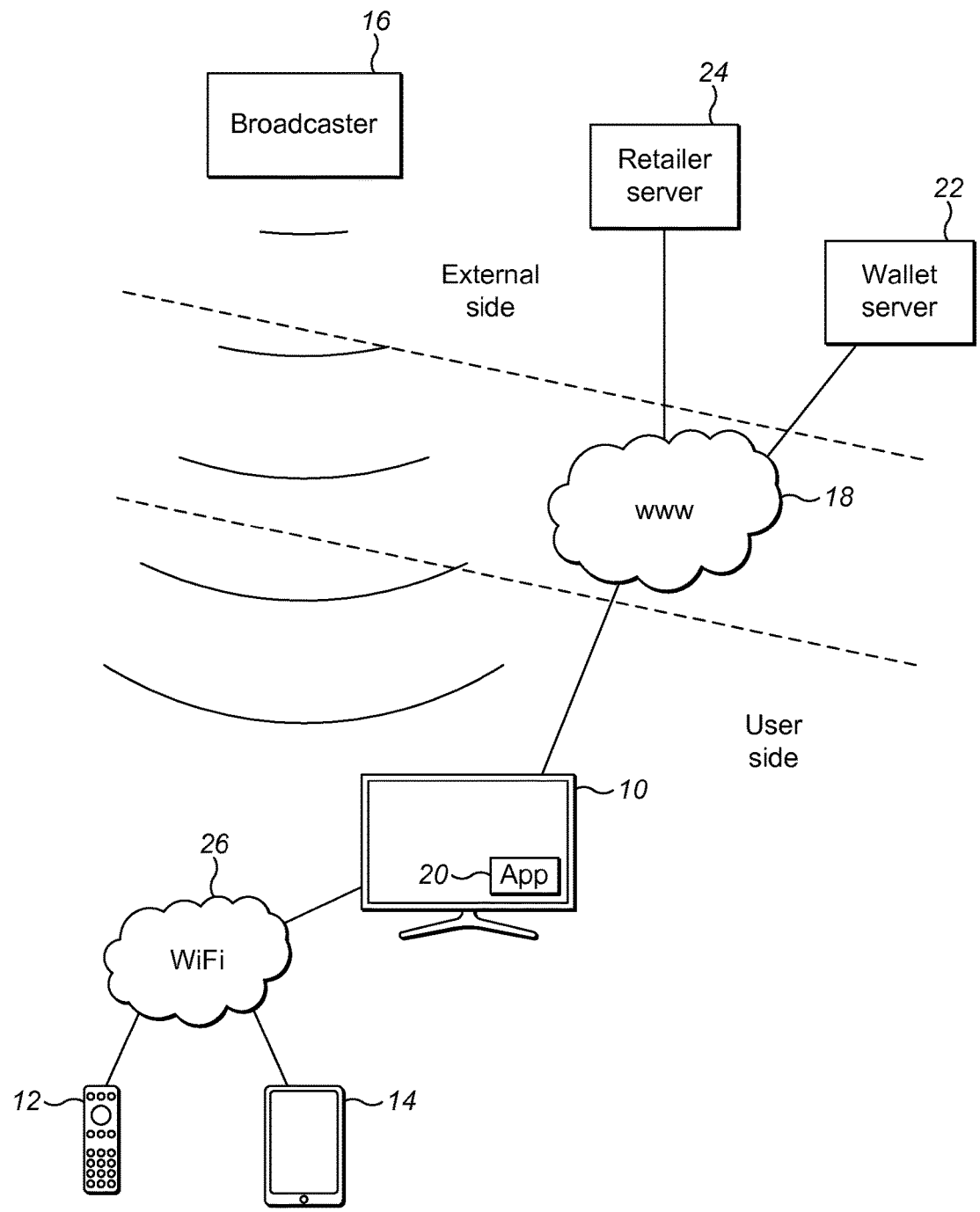
FIG. 1 is a schematic diagram showing the elements of a system, including a smart TV, for implementing an example useful for understanding an embodiment of the present disclosure.

A system for implementing an example useful for understanding the disclosure is shown in FIG. 1. The system comprises a set of both user-controlled and external elements, these being arranged in conjunction with a smart TV 10 which plays a central role in the present disclosure. The terms 'internet TV,' 'web TV,' 'internet protocol TV' (IPTV), 'connected TV', 'hybrid TV' and 'HbbTV' (hybrid broadcast-broadband TV) are also used in the art to refer to a smart TV, which for the purposes of this document is defined as a TV capable of receiving both broadcast and network-originating content. The smart TV 10 is related to the other elements of the system via various communication links and acts as a central hub for information processing and transmittal during the implementation of the disclosure. Although this example involves a smart TV, it will be appreciated that the same functionality may be achieved in other examples useful for understanding the disclosure by the use of a traditional TV for receiving broadcast content together with a set top box which is arranged to manage the so-called "smart" aspects via a connection to the Internet.

With reference to FIG. 1, on the user side, the system comprises further user devices. Firstly, a remote control 12 configured for interaction with the TV 10 allows a user to send instructions to the TV 10 relating to both broadcast and Internet-originating content. Secondly, a tablet computer 14 (such as an iPad®, Microsoft® Surface or Samsung® Galaxy Tab) allows a user to interact with the TV 10 and provides a second screen for enhancing the user's interaction with content displayed by the TV 10. The tablet computer 14 may provide the same functionality as the remote control 12 and consequently provide an alternative device to the remote control 12, and/or may provide additional interaction functionality, for example a user-friendly interface for linking a user's social media account to an interaction with broadcast content displayed by the TV 10.

The TV 10 receives broadcast and Internet-originating content from external sources. A broadcaster 16 transmits audio-visual content provided by specific channel owners by a mass communications medium, such as, for example, satellite broadcast, metropolitan local area network (MLAN) or an optical fibre cable network. In this document the term 'broadcast' includes unicast communication, i.e. "1 to 1" communications between a first party and a second party, multicast communication, i.e. communication from one party to a predetermined number of other parties, and genuine broadcast communication, i.e. communication from one party to an indeterminate number of parties. The TV 10 is also connected to the Internet 18 and can present Internet-originating content to a user either by means of a browser or by means of a specific application 20 or plug-in stored in a memory of the TV 10. Also connected to the Internet 18 are a wallet server 22 and a retailer server 24 which are arranged to serve information for interactions with the TV 10. The nature and roles of the wallet server 22 and retailer server 24 will be described further below in relation to a method according to the present embodiment of the disclosure. It is noted that in the description that follows the retailer server 24 is treated as being a server operated by a single retailer, e.g. a retailer selling sports equipment such as tennis racquets. However, it is envisaged that in other examples useful for understanding the disclosure the retailer server 24 may be operated by an entity which may or may not itself be a retailer and which provides access to retail servers of multiple other retail parties. In this case the user may gain access to retail options from multiple retail parties via the retailer server 24.

Once again with reference to FIG. 1, on the user side, the remote control 12 and tablet computer 14 are connected to the TV 10 by a local, home-based WiFi® network 26, although, as described below, this connection may, in alternative examples useful for understanding the disclosure, be provided by other means.

The application 20 together with the remote control 12 and/or the tablet computer 14 enables the user to interact with a third party such as the retailer server 24 in response to broadcast content that has been viewed at the TV 10. For example, if a live tennis match is being broadcast by the broadcaster 16 to the TV 10, the retailer server 24 may provide interaction opportunities such as retail opportunities to the user. For example, the retailer server may provide opportunities to buy tennis equipment perhaps at a discounted rate, or opportunities to buy tickets to attend a future related match. It is noted that the interaction opportunities that are provided to the TV 10 originate at a source that is independent of the broadcaster 16 or TV channel operator providing the broadcast content.

Figure 2:
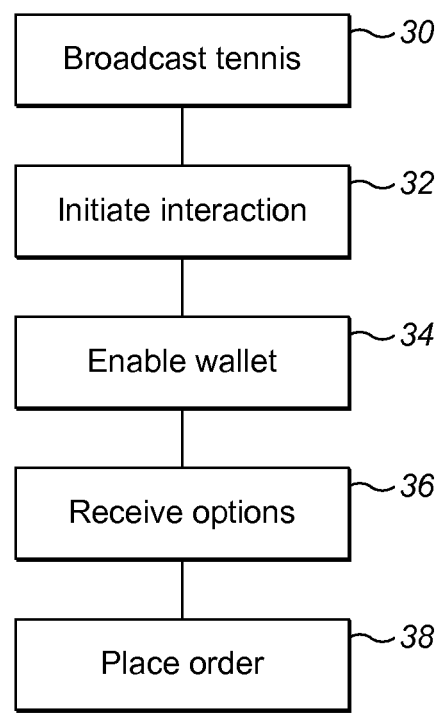
FIG. 2 is a flow chart showing the steps of a method of providing options for purchasing a product item according to an example useful for understanding an embodiment of the disclosure used with the smart TV FIG. 1.

Taking the above example of a tennis match as an illustrative example, FIG. 2 shows the method steps, once the match has started and is being broadcast live at step 30, that the user at home can perform. At step 32 the user may initiate an interaction with the TV 10. Once an interaction has been established, a wallet is enabled at step 34 for ordering equipment, for one example, associated with the match (in one example the user may be presented with an option to purchase the same racquets as the players in the match). From that point on, the user will receive options at step 36 for purchasing product items and when a product item is of interest the user can place an order at step 38 to purchase a product item (it is noted that the product item may be a physical item such as the racquets example above or another item such as a magazine subscription, coaching lessons etc. Depending on the broadcast in question the particular product items that the user may acquire will vary). This process allows a user, via the TV 10, to engage in an online interaction relating to broadcast content with a party not connected with the broadcaster or channel operator.

Figure 3:
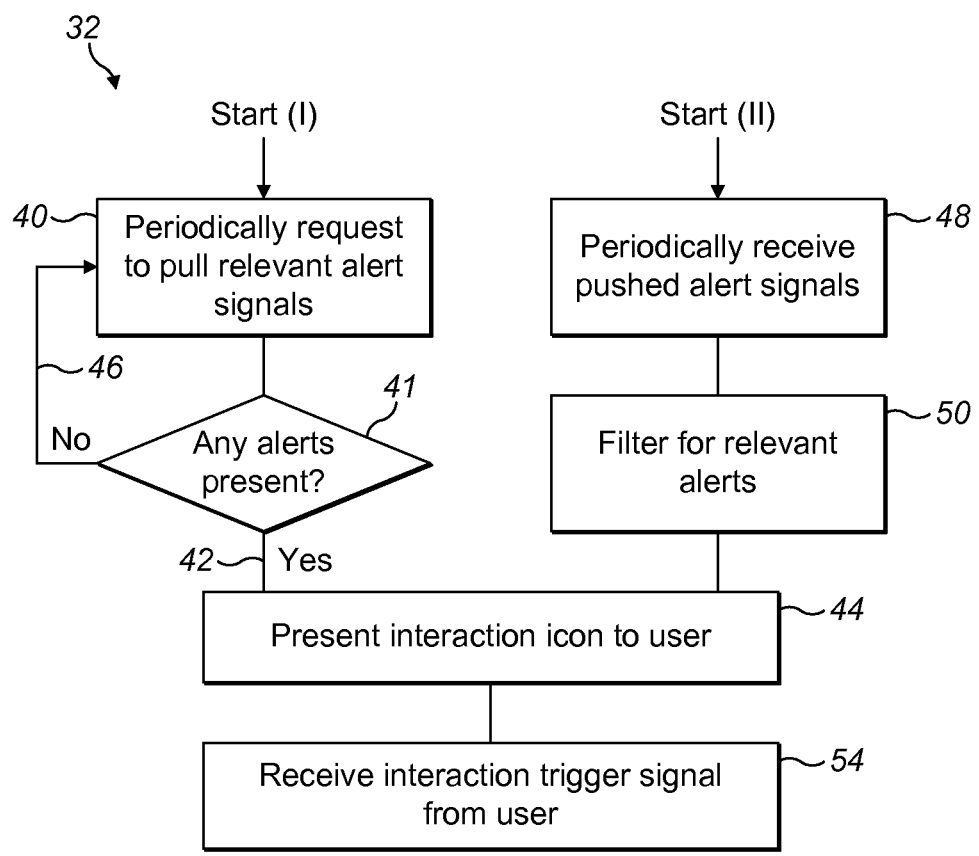
FIG. 3 is a flow chart exemplifying how an interaction is initiated according to the method of FIG. 2.

In order for content to be delivered to the user via the Internet, a connection between the TV 10 and the retailer 24 needs to be established. FIG. 3 describes how the TV application 20 may manage such an interaction.

Referring to FIG. 3, in a first (I) arrangement the application 20 periodically pulls at step 40 any available alert signals from the retailer server 24. The TV 10 has a set top box (not shown) from which the application 20 detects which channel the user is watching and the application 20 subsequently pulls only alert signals relating to the content of that channel. At step 41 the application 20 checks whether any alerts have been received. If one or more alert has been detected (route 42), the application 20 presents at step 44 an in-screen interaction icon to the user at the TV 10. If no alert has been received the application 20 cycles back, in step 46, to step 40 and again checks for updates.

In an alternative arrangement (II), the retailer server periodically pushes at step 48 alert signals to the application 20. These pushed alert signals correspond to a range of channels because the retailer server 24 cannot select the relevant alert signals because it has not detected which channel the user is watching. A filtering process is carried out at step 50 by the application 20, and if a relevant alert signal has been received the application 20 presents at step 44 an in-screen interaction icon to the user at the TV 10.

In both of the arrangements (I) and (II), it is the application 20 that determines which alert signals are relevant. The application 20 may either pull only the alert signals relating to the content of the channel being watched, or filter the alert signals pushed by the retailer server 24. As an alternative to the arrangements (I) and (II), however, the determination of which alert signals are relevant need not be performed by the application 20. In other examples useful for understanding the disclosure the determination may be performed remotely by the retailer server 24. This may be arranged regardless of whether the alert signals are pushed or pulled. This means that alert signals may be filtered at the retailer server 24 and subsequently pulled by the application 20, or otherwise may be selected by the retailer server 24 which then pushes only the selected alert signals to the application 20.

Regardless of where the determination of which alert signals are relevant takes place, the determination takes the form of a selection process based on predetermined criteria. In the description above, and in that which follows, the predetermined criteria are such that an alert is relevant if it relates to the channel being watched. However, in other examples useful for understanding the disclosure additional or alternative selection criteria may apply. For example, if the user is watching a program showing a football match, then alert signals relating to all sports programs may be categorised as being relevant. This approach could also be applied to cooking programs, documentaries and other categories of programs. In other examples, alert signals may be categorised as being relevant if they relate to a channel or program or program category that has been previously watched by the user, or if the user has previously expressed an interest in certain types of alerts, information or products. The user's interaction or previous interaction with the electronic program guide (EPG) and recording function of the TV 10 may additionally or alternatively be taken into account when categorising an alert signal as being relevant. In a further approach, the application 20 could recognise certain fragments of broadcast content or content received via a network that the user has watched or browsed, and provide alert signals if they relate to any of the recognised content. This recognition approach could use audio recognition technology such as or similar to Shazam®, or in the case of recognising content via a network the approach could make use of cookies for recognition purposes. In a different approach, a particular alert signal may be defined as being relevant, and consequently available to be pulled or pushed, at certain times of day only. For example, alert signals relating to a broadcast advert for over-the-counter sleeping medication could be made available between 21:00 and midnight.

Returning to the example of FIG. 3, the TV 10 has, at step 44, arrived at a situation in which the live tennis match is being received by broadcast, a dialogue has been established with the retailer server 24 to the extent that the application 20 has detected that the user can purchase product items related to the onscreen content (e.g. the tennis racquet purchase in the above example), and finally the user has been alerted to the fact that purchase of product items is possible for this event because the interaction icon is being presented to the user. At this point, if the user wishes to engage in an interaction, he or she can send a trigger signal, for example by pressing a select button on the remote control 12, which is received at step 54 by the application 20 at the TV 10. This completes the method step 32 of initiating an interaction.

In order to proceed to a stage where the user can purchase product items related to the tennis, a digital wallet is enabled at the TV 10 as described further below in relation to FIG. 4. This process of enabling a digital wallet corresponds to the method step 34. Wallet enablement may involve setting up a digital wallet from scratch if there is no digital wallet already there. However, regardless of the details of the wallet enablement process, the user is given the choice of whether to conduct this wallet enablement procedure in-screen at the TV 10, or whether they would prefer to use a separate device such as the tablet computer 14 as a second screen.

Figure 4:
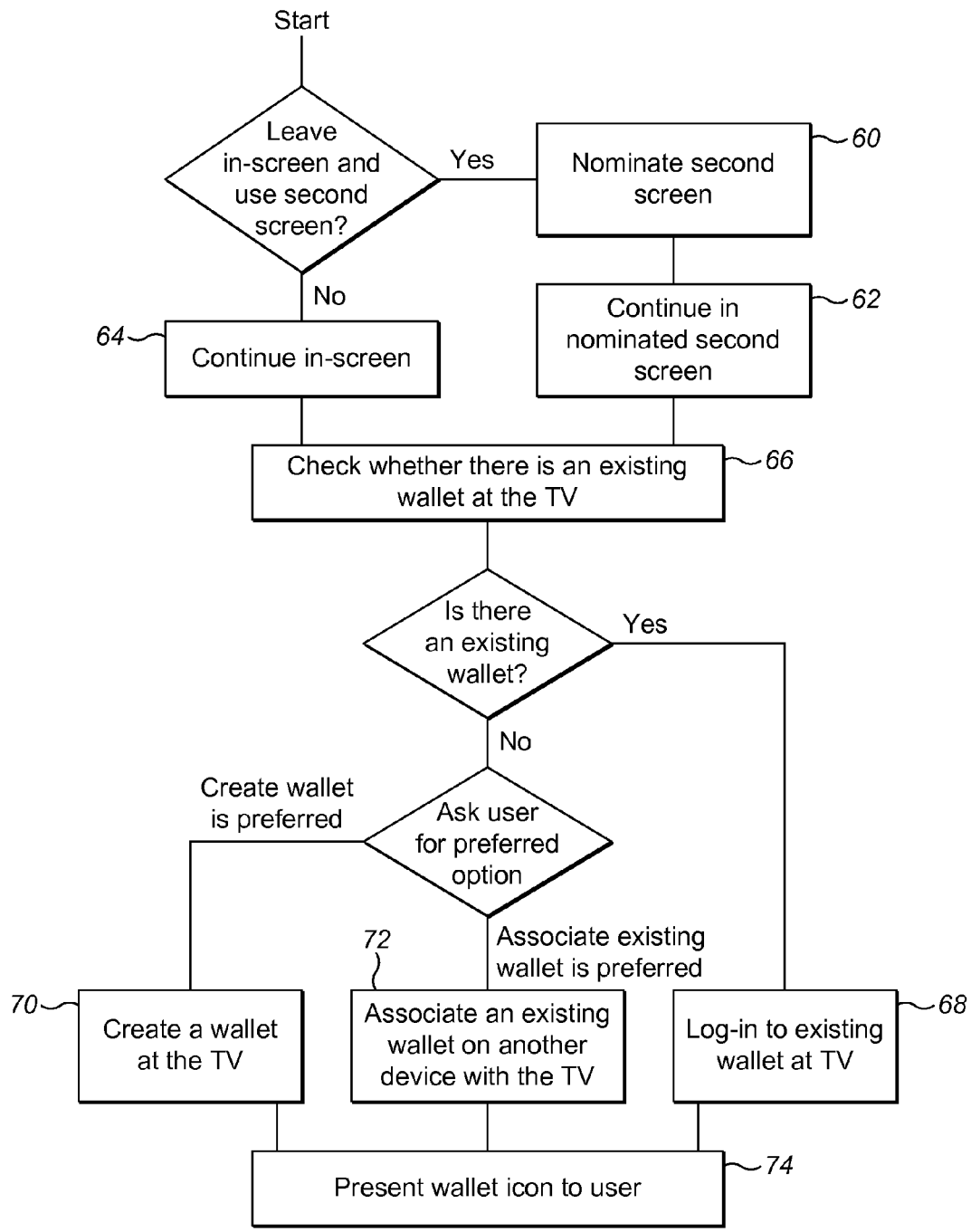
FIG. 4 is a flow chart exemplifying how a digital wallet is enabled according to the method of FIG. 2.

Accordingly, and with reference to FIG. 4, a message is presented at the TV 10 enquiring whether the user wishes to leave in-screen mode and move to a second screen. If the user selects 'yes', for example by scrolling between 'yes' and 'no' options displayed at the TV 10 and choosing 'yes' using the remote control 12, the TV 10 searches for local devices connected either via a WiFi® network or by another local connection and presents the discovered devices as a list on the TV screen to the user. The user then nominates at step 60 a second screen by selecting the desired device, and the wallet enablement process continues at step 62 on the nominated second screen. This shift to a second screen is described in further detail below. If the user selects 'no', the process continues at step 64 in-screen at the TV 10.

Regardless of which screen the wallet enablement process continues in, the TV 10 checks at step 66 whether there is already an existing, pre-registered wallet at the TV 10. At this point there are three possible routes for the wallet enablement procedure: create a wallet from scratch; associate the TV 10 with a wallet from a different device; log-in to an existing wallet.

If there is an existing wallet already registered at the TV 10 the user participates in a simple log-in procedure at step 68, for example by entering security or bank account details, and the wallet is enabled. Otherwise, the user is presented with a message asking which option is preferred out of creating a new wallet or associating an existing wallet. Depending on the user selection, either a new wallet is created at the TV 10 at step 70 or an existing wallet at another user device is associated with the TV 10 at step 72. The process of associating a pre-existing wallet from another device is described in further detail below. In either case, once a wallet has been created, associated or logged-into, a wallet icon is presented to the user at step 74, which completes the step 34 (FIG. 2) of enabling a wallet.

Figure 5A:
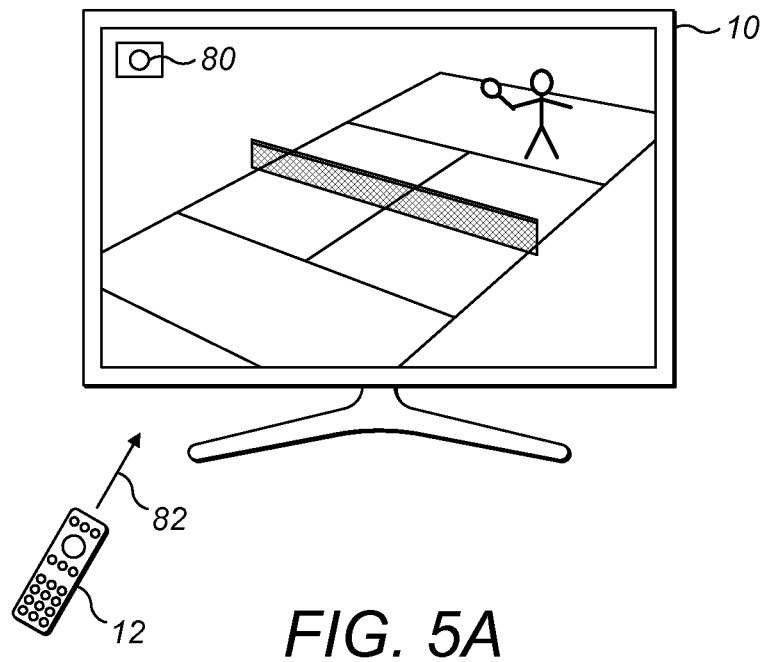
FIG. 5A is a screen representation of the smart TV of FIG. 1 displaying broadcast content and an overlaid interaction icon, together with a remote control for the TV.
Figure 5B:
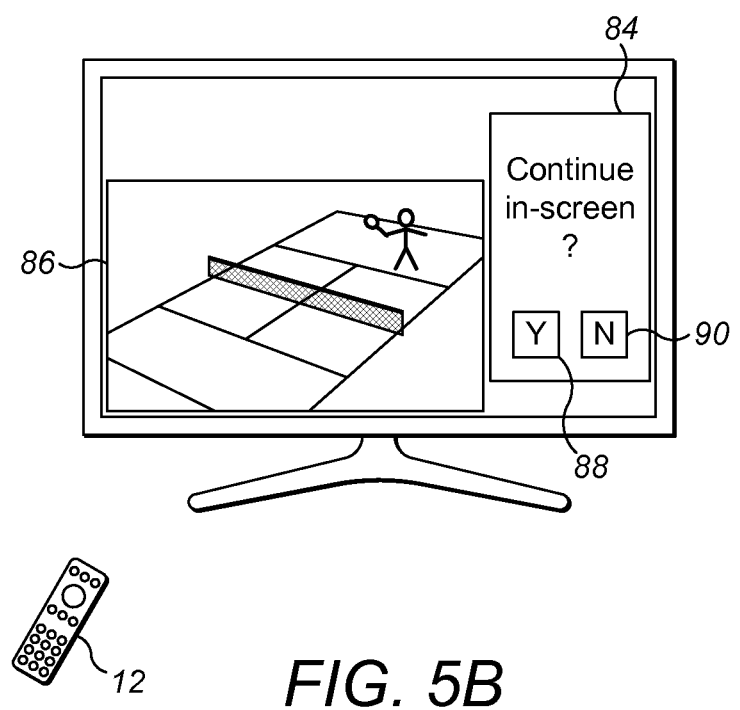
FIG. 5B is a screen representation of the smart TV of FIG. 1 displaying the broadcast content in a sub-set of the screen adjacent an in-screen message to the user for supporting user interaction, together with a remote control for the TV.

FIGS. 5A to 5F show screen representations of the 'initiate interaction' and 'wallet enablement' processes (steps 32 and 34 of FIG. 2 respectively). These steps can take place either in-screen at the TV 10 or by shifting to a second screen provided in this instance as a tablet computer. Referring to FIG. 5A, an interaction icon 80 appears in the screen of the TV 10 and the user can use the remote control 12 to send a trigger signal as indicated by arrow 82 to the TV 10. A message 84 is then displayed to the user, as shown in FIG. 5B, enquiring whether the process should be continued in-screen or on another device. Meanwhile, the broadcast tennis is displayed in a contracted sub-set 86 of the TV screen in order to make space for the 'continue in-screen?' message 84. Using the remote control 12, the user selects either a 'yes' option indicating that the process should be continued in-screen or a 'no' option indicating that the process should be continued on another device. These options are presented to the user as 'Y' and 'N' icons 88 and 90 within the message 84, and the process continues accordingly.

Figure 5C:
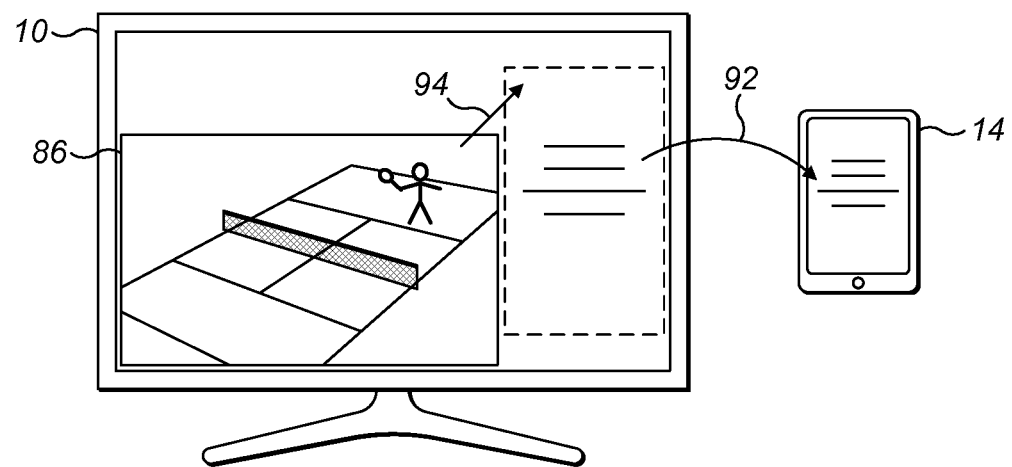
FIG. 5C is a screen representation of the transfer of the in-screen message of FIG. 5B to a second screen provided by a tablet computer.
Figure 5D:
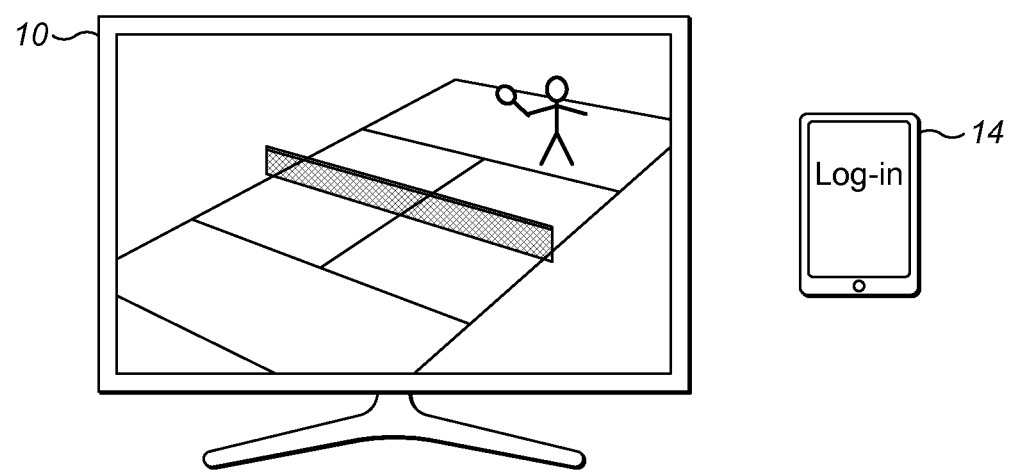
FIG. 5D is a screen representation of the TV of FIG. 1 displaying the broadcast content in full-screen and a log-in display on the tablet computer of FIG. 5C.

Referring to FIG. 5C, if the user selects the 'no' option the process moves as shown by arrow 92 to a second screen and the contracted sub-set 86 of the screen showing the tennis returns as indicated by arrow 94 to full-screen. As shown in FIG. 5D, the user then conducts the wallet enablement process, in this instance logging in to an existing wallet, using the tablet computer 14.

Figure 5E:
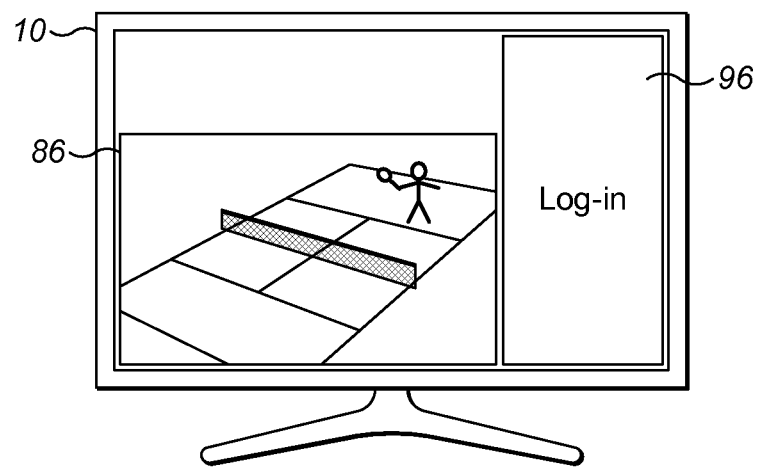
FIG. 5E is a screen representation of the smart TV of FIG. 1 displaying the broadcast content in a sub-set of the screen next to an in-screen log-in display, together with a remote control for the TV.

With reference to FIG. 5E, the user might alternatively select the 'yes' option, in which case the log-in process continues in-screen with the tennis continuing inside the sub-set 86 of the display area. Messages for the user relating to the log-in procedure are displayed in an in-screen interaction window 96 until the log-in procedure is complete.

Figure 5F:
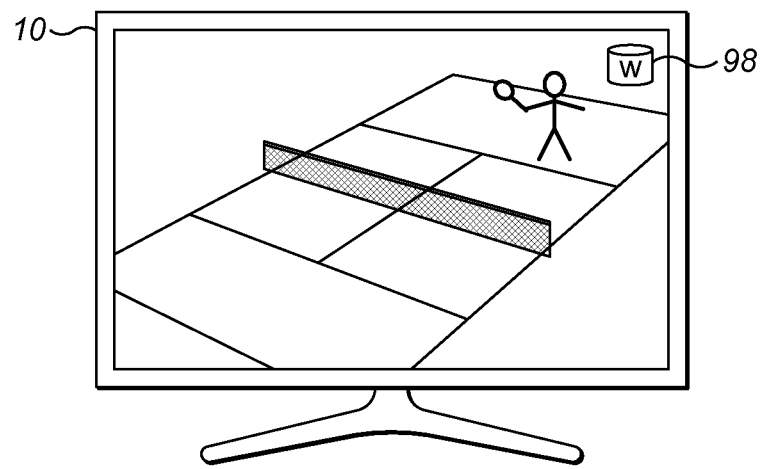
FIG. 5F is a screen representation of the TV of FIG. 1 displaying the broadcast content in full-screen and an overlaid wallet icon.

With reference to FIG. 5F, when log-in has been completed, the interaction window 96 is no longer displayed and the tennis returns to full-screen. Furthermore, a wallet icon 98 appears in-screen as shown in FIG. 5F to indicate that a wallet has been enabled at the TV.

Figure 6:
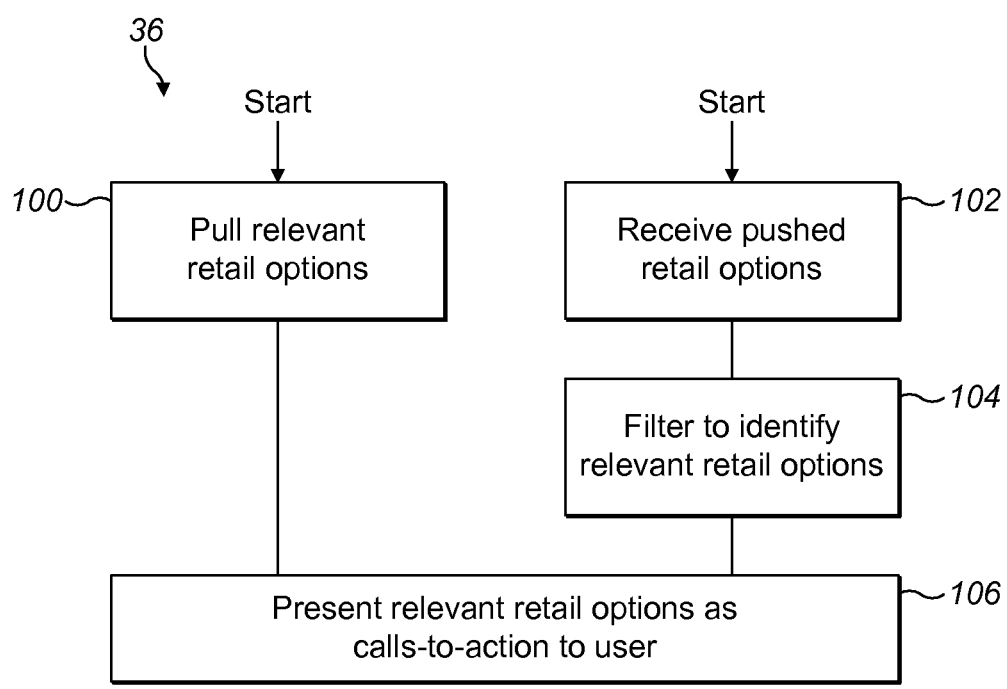
FIG. 6 is a flow chart exemplifying how offers are received according to the method of FIG. 2.

Now that the wallet is enabled, the user is in a position to review retail options for purchasing product items and to take action with respect to any retail options that are of interest. This process of receiving retail options is shown in FIG. 6 and has similarities with the process of initiating an interaction already discussed above in relation to FIG. 3. In both cases the application 20 pulls messages or receives pushed messages from the retailer server 24. However, in the case of FIG. 3 these messages are alert signals used earlier in the process to initiate an interaction between the user and the retailer server 24. By contrast, in the case of FIG. 6 the messages are retail options because the interaction has already been established and now the user is ready to actually receive and view retail options that may be of interest.

Referring to FIG. 6, the application 20 of the TV 10 obtains relevant retail options by pulling at step 100 retail options for the channel being watched from the retailer server 24. Alternatively, the application 20 may receive at step 102 pushed retail options for various channels and then filter at step 104 the retail options to extract only those relevant to the channel being watched. In either arrangement, the application 20 presents at step 106 relevant retail options to the user as calls-to-action which may be displayed in-screen at the TV 10 or on a second device such as the tablet computer 14 depending on whether the user has selected to use a second screen or not. Alternatively, as indicated above in relation to the receiving of alert signals, the retail options may in other examples useful for understanding the disclosure be selected for relevance remotely by the retail server 24 and subsequently be pushed to or pulled by the application 20 for display to the user.

This is the stage at which a user can make a decision as to whether to purchase a product item available for sale via a retail option. For each retail option that is displayed to the user, the user can choose to either ignore the in-screen retail option, in which case it goes away and there is no further activity relating to that particular retail option, or the user can decide that the retail option is of interest and can send an order trigger signal, for example using the remote control 12, to the TV 10, in order to initiate the step 38 of placement of an order for purchasing a product item.

Figure 7:
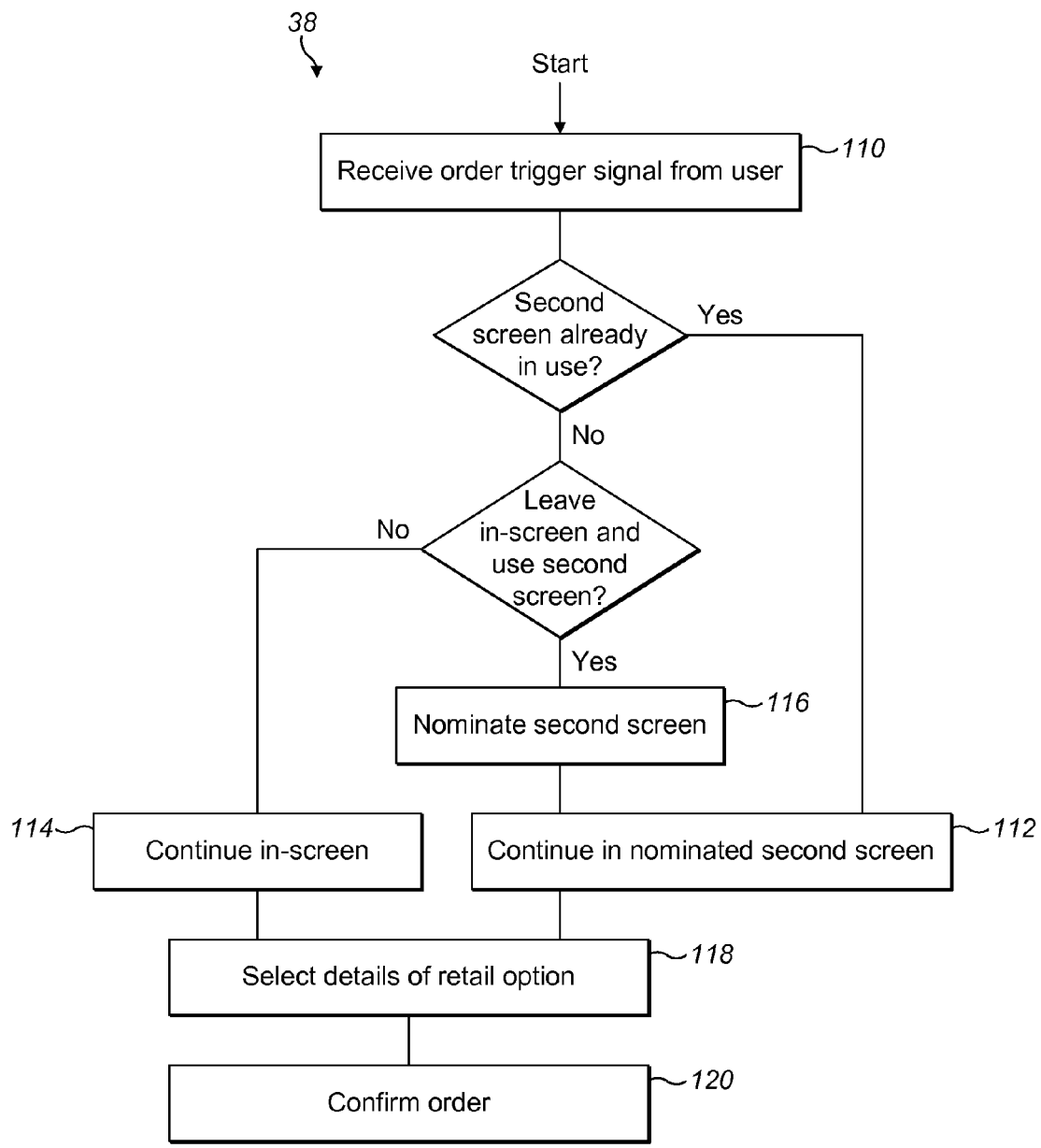
FIG. 7 is a flow chart exemplifying how an order for purchasing a product item is placed according to the method of FIG. 2.

In this case, and with reference to FIG. 7, the order trigger signal is received by the TV 10 at step 110. If the user has previously elected to use a second screen, the process continues at step 112 in that second screen. Alternatively, a message is displayed to the user enquiring whether the process should continue in-screen at the TV 10 or whether a second screen is preferred. If the user selects not to use a second screen, the process continues at step 114 in-screen at the TV 10. Otherwise, the TV 10 looks for local devices within the WiFi® network 26 and presents discovered devices to the user for selection. The user then nominates a second screen at step 116 by selecting one of the discovered devices and the process continues at step 112 in the nominated second screen. Various options, for example buying a tennis racquet that has been used in the broadcast match, are then displayed to the user who then selects at step 118 details of a retail option of interest. Finally, the user confirms an order at step 120 which completes the step 38 of placing an order for purchasing a product item.

It will be appreciated that tennis and purchasing tennis racquets are only examples of broadcast content and associated interaction opportunities. Other examples do not have to relate to tennis, or even to sport. For example, if a program about property and buying homes is being broadcast, interaction opportunities could be offered which relate to estate agent offers.

The example useful for understanding the disclosure also envisages an arrangement in which the broadcaster and retailer server are parts of or are controlled by the same entity.

For example, the service provider Sky® offers packages for providing both broadband Internet services and broadcast media.

As indicated above, the wallet enablement step may involve importing a pre-existing wallet from another device so that that wallet becomes associated with the TV 10. This importation step is part of a wider wallet propagation functionality according to the present disclosure that involves pushing existing wallets from one device to another.

Figure 8:
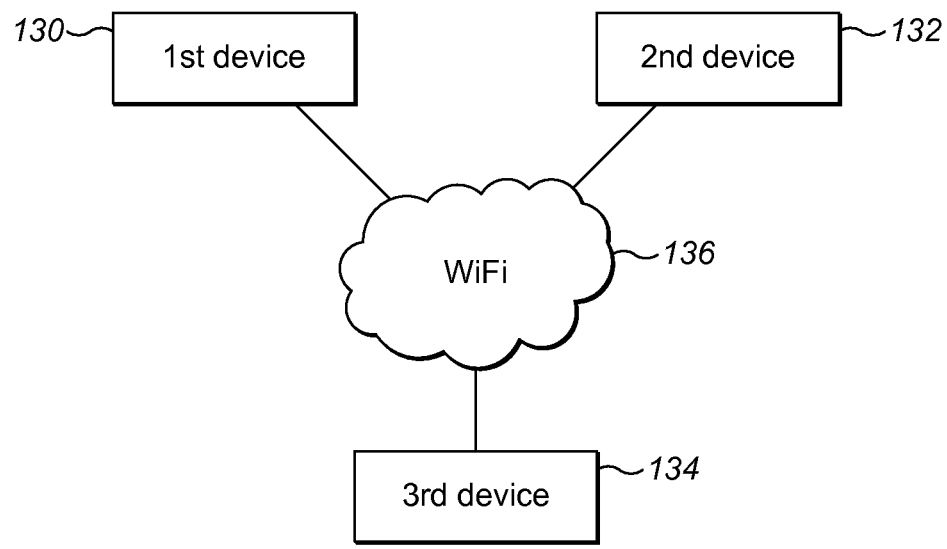
FIG. 8 is a schematic block diagram showing locally connected user devices for implementing a method of wallet propagation according to an embodiment of the present disclosure.

With reference to FIG. 8, an embodiment of the present disclosure involves first, second and third user devices, 130, 132 and 134, linked by a local, home-based WiFi® connection 136 so that wallet functionality can be pushed between the devices locally in the user's home environment.

Figure 9:
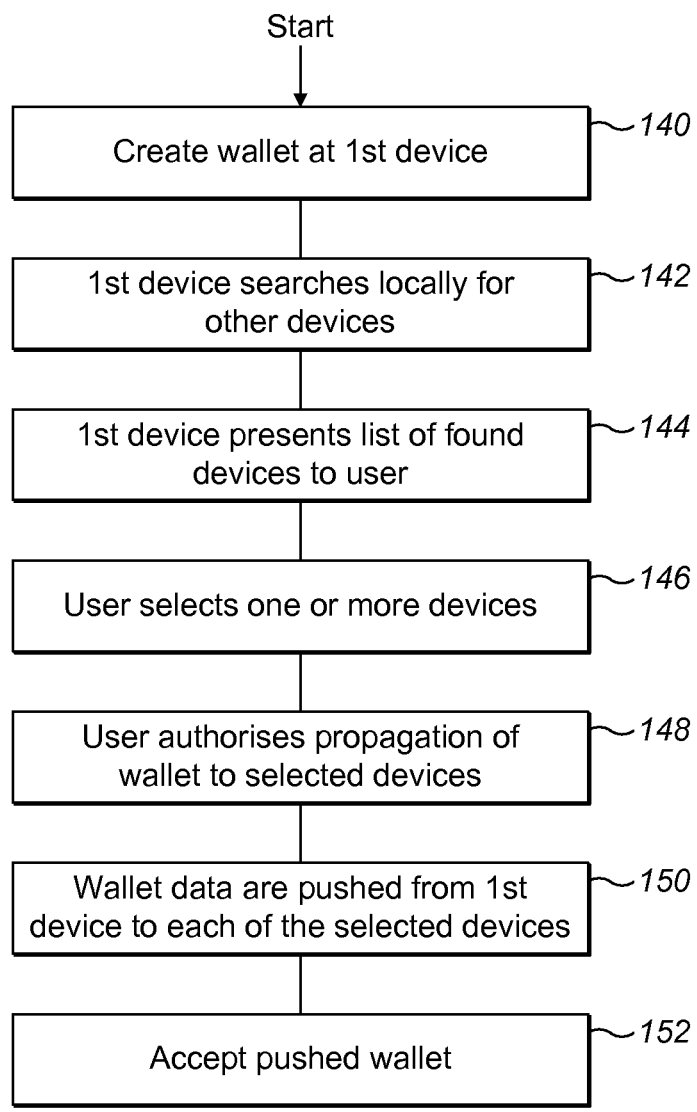
FIG. 9 is a flow chart showing the method of wallet propagation referred to above in relation to FIG. 8.

Referring to FIG. 9, the process begins with creating at step 140 a wallet, for example by registering a card based account, at the first device 130. With a wallet set up, the first device 130 is ready to propagate the wallet throughout the other devices in the local network. The first device 130 searches at step 142 for other devices in the local network. In this case the other devices are the second and third devices, 132 and 134, as shown in FIG. 8, which may for example be tablet computers, smartphones, personal computers and so on.

On completion of the search, the first device 130 presents, at step 144, the user with a list of found devices, in this case the second and third devices 132, 134, so that the user can select which of the devices found at step 142 they wish to push wallet functionality to. The user can then select at step 146 the chosen devices by interacting with a user interface of the first device 130, and this initiates the propagation of the wallet functionality to those specifically selected devices. As an authentication measure, a personal identification number (PIN) or other security challenge, such as an alphanumeric code, biometric or gesture authentication is utilised at the first device 130 in order for the user to authorise at step 148 the propagation of the wallet to the selected devices. Finally, following user authentication, wallet data is pushed at step 150 from the first device 130 to each of the selected devices, and at each of the selected devices the user accepts at step 152 the pushed wallet to complete the propagation. By propagating the wallet functionality in this way between devices, the user can establish an electronic wallet at multiple devices without having to enter the basic information for creating a wallet repeatedly at each device.

An example is shown in FIGS. 10A to 10F involving a smart TV 160, a smartphone 162, and a tablet 164. The approach in this example is to propagate wallet functionality from the TV 160 to both the smartphone 162 and the tablet 164 so that wallets are established over a local WiFi® network on all three devices. For ease of reference, device-to-device communications are shown with direct arrows rather than going via a WiFi® network. However, it will be appreciated that this is merely a simple representation of an arrangement in which local communications are conducted via a local, home WiFi® network.

Figure 10A:
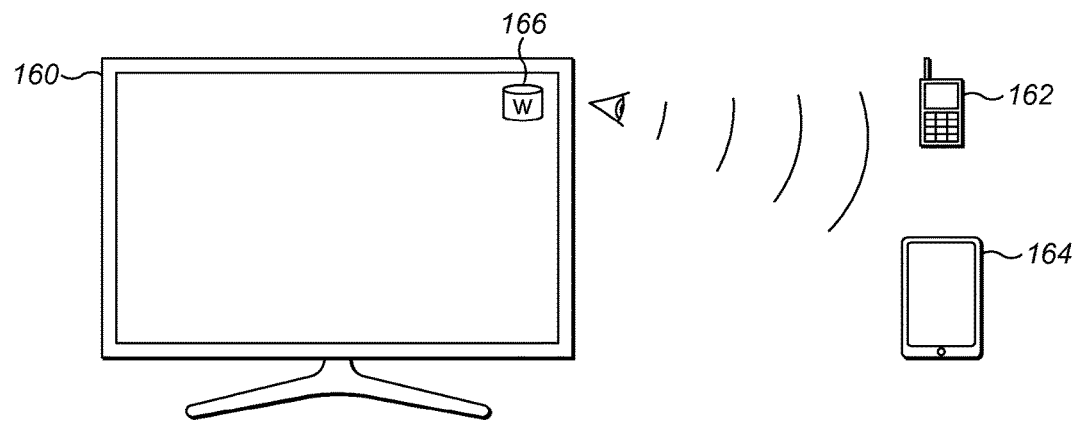
FIG. 10A is a screen representation of a smart TV searching for other local devices as part of the searching step of the method of FIG. 9.
Figure 10B:
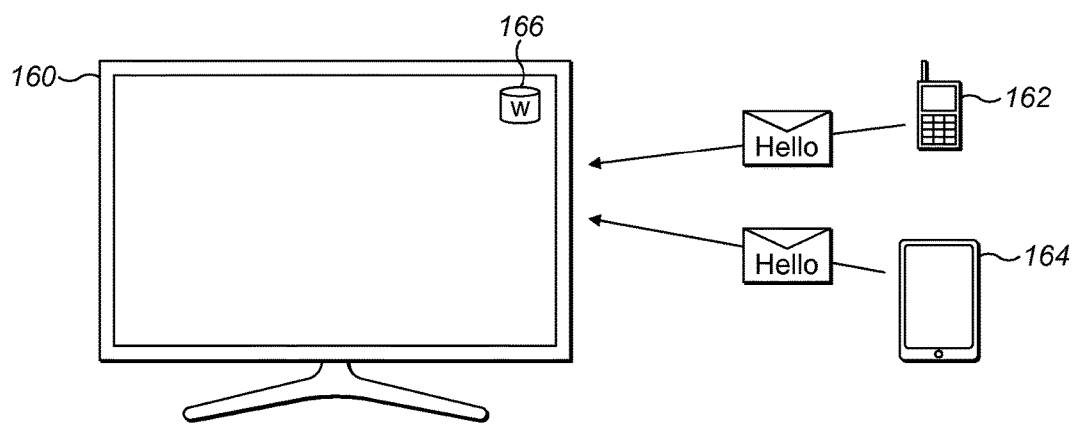
FIG. 10B is a screen representation of the smart TV of FIG. 10A receiving messages from local devices as part of the searching step of the method of FIG. 9.
Figure 10C:
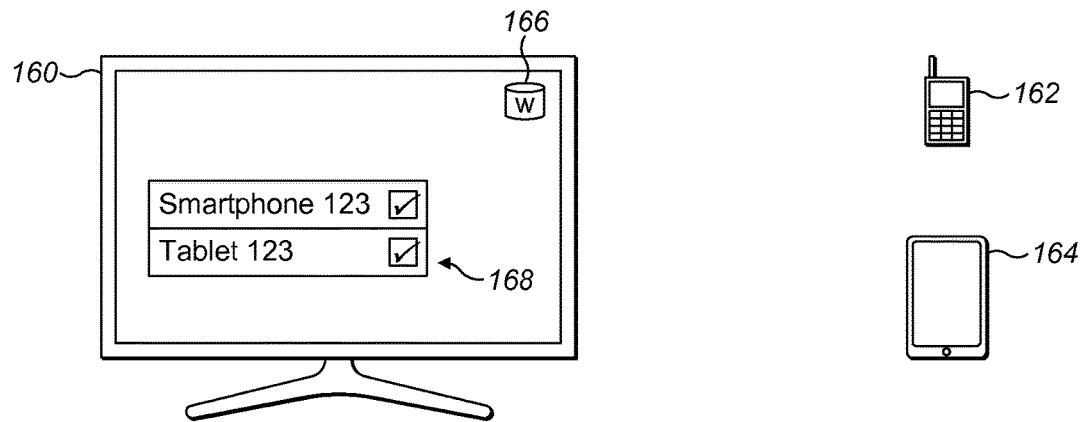
FIG. 10C is a screen representation of the smart TV of FIG. 10A presenting found devices to the user for user-selection as part of the method of FIG. 9.
Figure 10D:
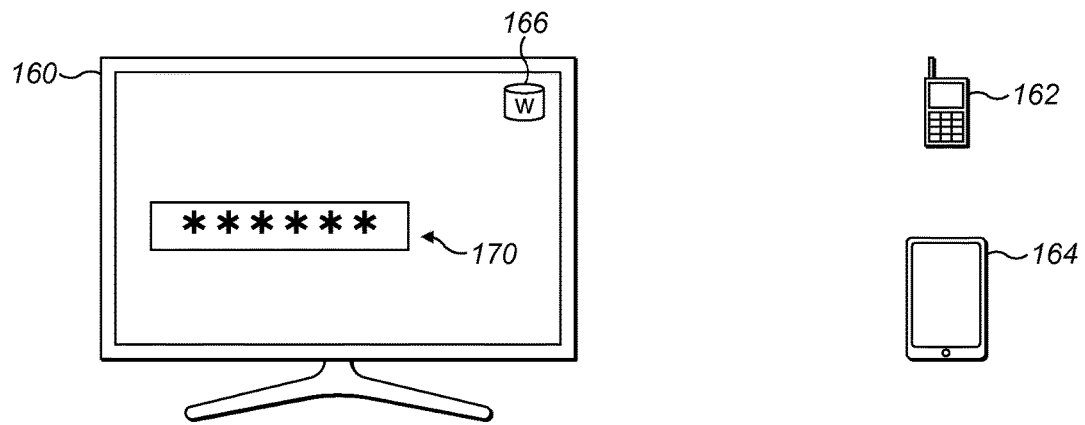
FIG. 10D is a screen representation of the smart TV of FIG. 10A presenting a personal identification number (PIN) code entered by the user as part of the authorising step of the method of FIG. 9.
Figure 10E:
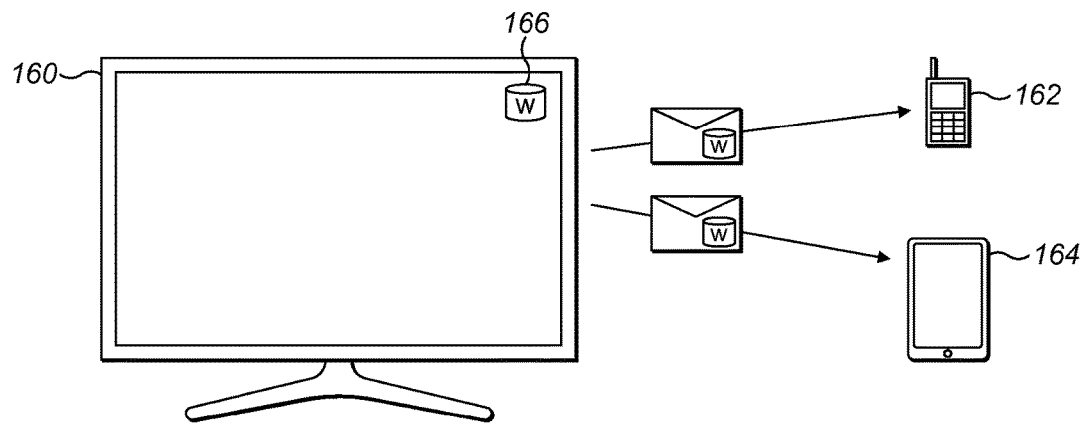
FIG. 10E is a screen representation of the smart TV of FIG. 10A pushing wallet data to the found devices as part of the method of FIG. 9.
Figure 10F:
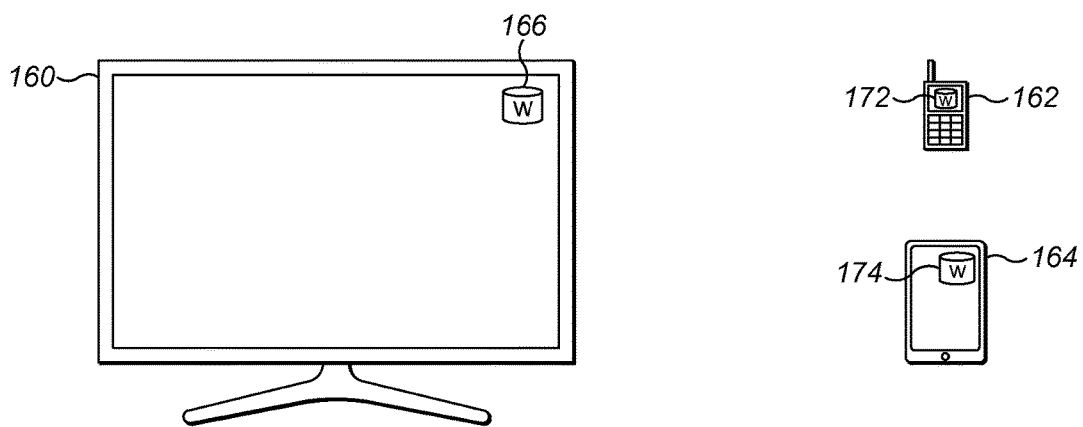
FIG. 10F is a screen representation of the smart TV of FIG. 10A together with the found devices at a stage after that shown in FIG. 10E in which all of the devices display a wallet icon.

Referring to FIG. 10A, the wallet functionality starts at the smart TV 160, as indicated by the in-screen wallet icon 166. The TV 160 searches for other devices (step 142) which then respond to make themselves known to the TV 160, as shown in FIG. 10B. The TV 160 has then detected which devices have been found in the local area and presents these (step 144) to the user as a list 168, as shown in FIG. 10C. By interacting with the TV 160, for example using a remote control, the user can then select (step 146) which of the displayed devices they wish to propagate the wallet functionality to. At this point, and referring to FIG. 10D, the TV 160 prompts the user to enter a six-digit PIN 170 to authorise (step 148) propagation of the wallet to the selected devices, and finally wallet data is pushed (step 150) to the selected devices, as shown in FIG. 10E. Finally, and with reference to FIG. 10F, the wallet functionality is enabled at all three devices, and three wallet icons 166, 172, and 174 are displayed.

In a variation of this approach wallet propagation need not be implemented over a local network. If the wallet is cloud based, any one or all of the user devices 130, 132 134 could be elsewhere on a visiting network such as a WiFi® network in a café. In that case, a wallet could be created at the first device 130, and that first device 130 could subsequently transmit a message to the cloud instructing it to push the wallet functionality to the second device 132. For this to work, the user of the first device 130 would need to know the IP address of the second device 132, such as the home WiFi® or a café WiFi, so that the cloud can be instructed as to where to push the wallet functionality to. This IP address information could be communicated by a range of methods, some of which may involve coupling the first and second devices 130 and 132 so that they inform each other of their location, as is known in the art.

Regardless of whether a wallet has been created from scratch at a particular device or has been propagated to that device locally or over the cloud from another device, that device can be used to receive offers (step 36) and place orders (step 38) via both home and visiting networks. As a result, and according to an embodiment of a further aspect of the present disclosure, useful differentiations can be made between transactions made at home and transactions made elsewhere.

According to the embodiment of the further aspect of the present disclosure, a differentiation can be made as to transaction risk levels depending on whether the device is at home or visiting. A transaction conducted from a device at home (a 'home' transaction) is considered less risky than a transaction conducted from the same device via a visiting network (an 'away' transaction). This is because it is assumed by many organisations that a device being used at home is in the control of its owner and that the transaction is therefore more likely to be "legitimate" than one from a visiting network. This is in contrast to a device being used away from home where it is generally accepted that the risk and likelihood of theft and malicious use are higher. As such, different conditions may be applied to home and away transactions in order to manage the differentiation of risk.

Figure 11:
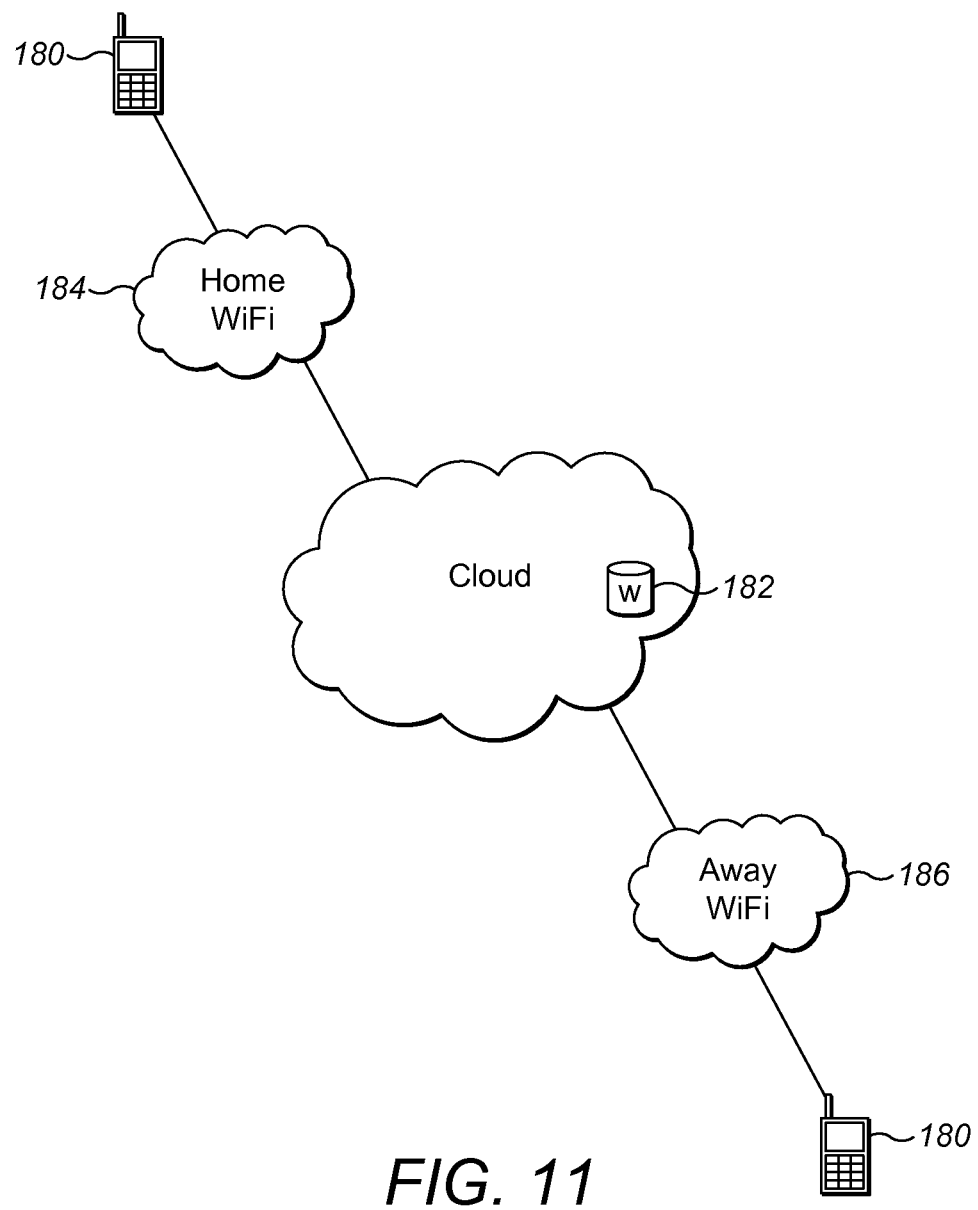
FIG. 11 is a schematic diagram showing two smartphones connected to a cloud-based wallet via home and visiting WiFi® networks respectively for implementing a method of wallet security according to an embodiment of a further aspect of the present disclosure.

Referring to FIG. 11, a user's smartphone 180 is shown in two configurations: one at home and being connected to a cloud based wallet 182 via a home WiFi® network 184, and the other away from home and being connected to the cloud based wallet 182 via a visiting WiFi® network 186. It is not essential that the wallet be cloud based, and in another suitable approach the wallet functionality is client-side, that is to say based at the smartphone 180 itself. In either case, the smartphone 180 conducts the transaction either via the home WiFi® network 184 or via the visiting WiFi® network 186, depending on its physical location.

Figure 12:
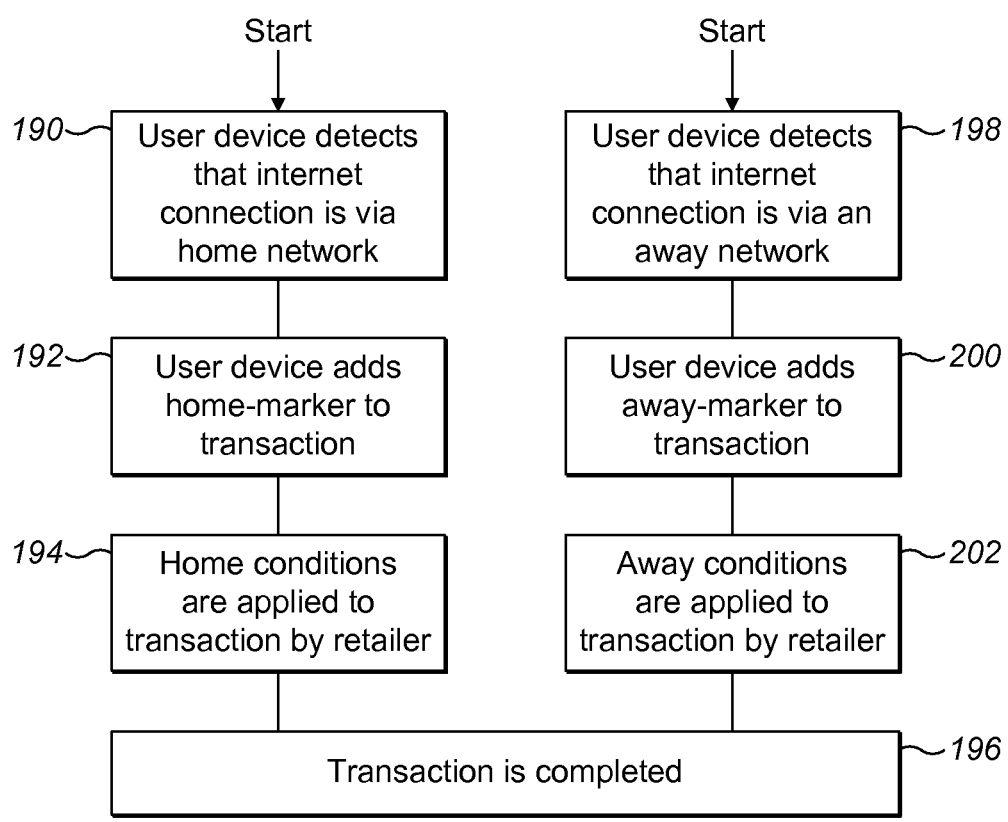
FIG. 12 is a flow chart showing the method of wallet security referred to above in relation to FIG. 11.

With reference to FIG. 12, if a user device such as the smartphone 180 is at home, it detects, at step 190, that it is connected to the home network. In any transactions using the device's wallet functionality, the device adds at step 192 a home-marker such as its home IP address, to the transaction in order to indicate that the transaction is taking place from home. Home conditions such as lower merchant charges than would be applied if the device were connected to a visiting network are then applied at step 194 to the transaction, and finally at step 196 the transaction is completed.

Similarly, if the device is in a visiting network, it starts by detecting this at step 198, it subsequently adds at step 200 an away-marker such as an IP address to any transactions, away conditions such as higher merchant charges than those applied on the home network are applied at step 202, and the transaction is completed at step 196.

Differentiating between the use of home and visiting networks may also be used in contexts other than transaction risk management. Depending on whether a user device is at home or away, location-based offers or device-specific offers may be pushed to the device. For example, offers relating to a particular shop near the device's physical location can be pushed to the device when it is in an appropriately located visiting network. At home, offers can be pushed to specific devices when it is known that pushing to that specific type of device, for example a tablet computer rather than a smartphone, is more likely to lead to a transaction.

Variations of the above-described embodiments and examples are envisaged which take slightly different approaches. For example, interaction options such as retail options may not be sent directly from the retailer server 24 to the TV 10 via the internet 18, but rather may be routed via the broadcaster 16 which overlays them on the relevant content for a relevant TV channel and routes the interaction options to the user by broadcasting them in-program.

On the user device side, the trigger signals sent to the TV (whether a smart TV or an IPTV) do not have to be sent from a conventional remote control, but may alternatively be sent from a tablet computer or other user device, for example over a home WiFi® connection. In a further alternative the TV could receive audio commands from the user or could even be operated by user controls of the TV itself.

Local connection between user devices for implementing any or all steps of the method of FIG. 2 or for implementing wallet propagation as described in relation to FIG. 9 need not be via a WiFi® connection but could rather be by any appropriate local network.

In an alternative to the method of FIG. 2, a user could enable wallet functionality at a device, and optionally propagate that wallet to other devices as described above, for the purpose of interacting with a web-based user profile such as a social networking user profile. Alternatively the user could access other interaction options such as betting opportunities or paid-for or free-of-charge voting capabilities. Still alternatively, a user could purchase goods or services relating to an advertisement that was being received at the time of initiating a trigger event or otherwise sending a command to the TV.

Although the present disclosure has been described in connection with specific embodiments, it should be understood that various changes, substitutions, and alterations apparent to those skilled in the art can be made to the disclosed embodiments without departing from the spirit and scope of the disclosure as set forth in the appended claims.

The invention claimed is:

1. A method of disseminating a digital wallet to a target device, comprising:
   searching, with a searching device, on a local network for the target device, wherein the digital wallet is an electronically stored registered card based account for use in electronic commercial transactions, and wherein the entire digital wallet is absent from the target device prior to the search;
   selecting at the searching device one or more target devices;
   receiving a trigger signal from a remote control; and
   in response to the received trigger signal, pushing the entire digital wallet, including digital wallet functionality, to the target device selected at the searching device by a user to establish the digital wallet at the target device, and only if user authorisation has been received by the searching device to establish the digital wallet at the target device without having to enter information at the target device to create a new digital wallet at the target device.

2. The method according to claim 1, wherein pushing the digital wallet to the target device comprises pushing the digital wallet from the searching device over the local network.

3. The method according to claim 1, wherein pushing the digital wallet to the target device comprises pushing the digital wallet from the cloud over the Internet in response to an instruction from the searching device.

4. The method according to claim 1, comprising the target device accepting the pushed digital wallet only if user authorisation has been received by the target device.

5. The method according to claim 1, wherein the searching step comprises searching for a plurality of target devices, the method comprising selecting at the searching device one or more target devices and wherein the digital wallet is pushed only to the or each target device selected at the searching device by the user.

6. The method according to claim 1, further comprising:
   receiving at the user an indication that the digital wallet has been established at the target device.

7. A method of disseminating a digital wallet to a target device, comprising:
   searching for a plurality of target devices, with a searching device, on a local network for the target device, wherein the digital wallet is an electronically stored registered card based account for use in electronic commercial transactions, and wherein the entire digital wallet is absent from the target device prior to the search;
   selecting at the searching device one or more target devices;
   receiving a trigger signal from a remote control; and
   in response to the received trigger signal, pushing the entire digital wallet, including digital wallet functionality, only to each target device selected at the searching device by a user to establish the digital wallet at the target device, and only if user authorisation has been received by the searching device to establish the digital wallet at the target device without having to enter information at the target device to create a new digital wallet at the target device; and
   accepting the pushed digital wallet only if user authorisation has been received by the target device;
   wherein pushing the digital wallet to the target device comprises pushing the digital wallet from:
   the searching device over the local network; or
   the cloud over the Internet in response to an instruction from the searching device.

8. A system for disseminating a digital wallet to a target device, the system comprising:
   a searching device for searching on a local network for a target device, wherein the digital wallet is an electronically stored registered card based account for use in electronic commercial transactions, and wherein the entire digital wallet is absent from the target device prior to the search;
   a memory; and
   a processor that performs instructions to:
      receive a trigger signal from a remote control;
      in response to the received trigger signal, push the entire digital wallet, including digital wallet functionality, to the target device to establish the digital wallet at the target device without having to enter information at the target device to create a new digital wallet at the target device only if user authorisation has been received by the searching device, and wherein the target device is selected at the searching device by a user.

9. A non-transitory computer readable storage medium storing instructions thereon, the instructions executable by a processor and arranged to:
   search, with a searching device, on a local network for a target device, wherein the digital wallet is an electronically stored registered card based account for use in electronic commercial transactions, and wherein the entire digital wallet is absent from the target device prior to the search;
   receive a selection at the searching device of one or more target devices;
   receive a trigger signal from a remote control; and
   in response to the received trigger signal, push the entire digital wallet, including digital wallet functionality, to the target device selected at the searching device by a user to establish the digital wallet at the target device, and only if user authorisation has been received by the searching device to establish the digital wallet at the target device without having to enter information at the target device to create a new digital wallet at the target device.

* * * * *